(12) United States Patent
Harris et al.

(10) Patent No.: US 12,536,466 B2
(45) Date of Patent: Jan. 27, 2026

(54) SYSTEMS AND METHODS TO MONITOR TRAINED INTELLIGENCE AGENTS

(71) Applicant: International Business Machines Corporation, Armonk, NY (US)

(72) Inventors: Brandon Harris, Union City, NJ (US); Chaz Vollmer, Raleigh, NC (US); Eugene Irving Kelton, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 1282 days.

(21) Appl. No.: 17/331,191

(22) Filed: May 26, 2021

(65) Prior Publication Data
US 2022/0383182 A1 Dec. 1, 2022

(51) Int. Cl.
*G06N 20/00* (2019.01)
*G06N 3/006* (2023.01)
(Continued)

(52) U.S. Cl.
CPC .............. *G06N 20/00* (2019.01); *G06N 5/04* (2013.01); *G06Q 30/0201* (2013.01);
(Continued)

(58) Field of Classification Search
CPC ........ G06N 20/00; G06N 20/10; G06N 20/20; G06N 5/02; G06N 5/022; G06N 5/025; G06N 5/04; G06N 3/006; G06Q 30/0201
See application file for complete search history.

(56) References Cited

U.S. PATENT DOCUMENTS

| 5,949,045 A | 9/1999 | Ezawa et al. |
| 10,127,554 B2 | 11/2018 | Russell et al. |

(Continued)

FOREIGN PATENT DOCUMENTS

| CN | 103716324 B | 4/2017 |
| CN | 111177216 A | 5/2020 |

(Continued)

OTHER PUBLICATIONS

Jing, L., et al., "An Entropy Weighting k-Means Algorithm for Subspace Clustering of High-Dimensional Sparse Data", IEEE Transactions on Knowledge and Data Engineering, Aug. 2007, pp. 1026-10-14, vol. 19, No. 8.

(Continued)

*Primary Examiner* — Shane D Woolwine
(74) *Attorney, Agent, or Firm* — Scully, Scott, Murphy & Presser, P.C.; Stosch Sabo

(57) ABSTRACT

A method, system, and computer programming product that includes providing a trained intelligent agent to predict the transactional activity of one or more persons; predicting, by the trained intelligent agent, simulated transactional activity of a person, simulated person, or a set of simulated persons, for a measured period; scoring the simulated transactional activity for the measured period; injecting testing data into the simulated transactional activity to form testing transactional behavior for the measured period; scoring the testing transactional behavior for the measured period; determining if the score of the simulated transactional activity is different than the score of the testing transactional activity; and generating, in response to the score of the simulated transaction activity deviating from the score of the testing transactional activity for the measured period, a report.

20 Claims, 7 Drawing Sheets

(51) Int. Cl.
*G06N 5/02* (2023.01)
*G06N 5/022* (2023.01)
*G06N 5/025* (2023.01)
*G06N 5/04* (2023.01)
*G06Q 30/0201* (2023.01)

(52) U.S. Cl.
CPC ............... *G06N 3/006* (2013.01); *G06N 5/02* (2013.01); *G06N 5/022* (2013.01); *G06N 5/025* (2013.01)

(56) References Cited

U.S. PATENT DOCUMENTS

| | | |
|---|---|---|
| 10,235,443 B2 | 3/2019 | Hackett-Jones et al. |
| 10,257,211 B2 | 4/2019 | Balabine |
| 10,769,722 B1 | 9/2020 | Flowers et al. |
| 11,494,835 B2 | 11/2022 | Harris et al. |
| 2010/0145836 A1 | 6/2010 | Baker et al. |
| 2015/0032624 A1 | 1/2015 | Claridge et al. |
| 2016/0140599 A1* | 5/2016 | Castro da Silva ..... G06N 20/00 705/14.41 |
| 2016/0358040 A1 | 12/2016 | Fang |
| 2017/0255688 A1 | 9/2017 | Hackett-Jones et al. |
| 2017/0339168 A1 | 11/2017 | Balabine |
| 2018/0150843 A1 | 5/2018 | Adjaoute |
| 2019/0205322 A1 | 7/2019 | Dobrynin et al. |
| 2019/0236458 A1 | 8/2019 | Taylor et al. |
| 2019/0340615 A1 | 11/2019 | Hanis et al. |
| 2020/0082832 A1* | 3/2020 | Trim ...................... G10L 15/22 |
| 2020/0175518 A1 | 6/2020 | Chu et al. |
| 2021/0013386 A1 | 1/2021 | Zeng et al. |
| 2021/0097546 A1 | 4/2021 | Adjaoute |
| 2021/0133488 A1 | 5/2021 | Harris et al. |
| 2021/0133489 A1 | 5/2021 | Harris et al. |
| 2021/0133490 A1 | 5/2021 | Harris et al. |
| 2021/0133586 A1 | 5/2021 | Harris et al. |
| 2021/0133644 A1 | 5/2021 | Harris et al. |
| 2021/0133751 A1 | 5/2021 | Harris et al. |
| 2021/0133752 A1 | 5/2021 | Harris et al. |
| 2021/0133771 A1 | 5/2021 | Harris et al. |
| 2021/0133772 A1 | 5/2021 | Harris et al. |
| 2021/0133783 A1 | 5/2021 | Harris et al. |
| 2021/0133864 A1 | 5/2021 | Harris et al. |
| 2021/0133892 A1 | 5/2021 | Harris et al. |
| 2021/0192412 A1 | 6/2021 | Krishnaswamy |

FOREIGN PATENT DOCUMENTS

| | | |
|---|---|---|
| EP | 1340178 A4 | 6/2005 |
| JP | 2002083110 A | 3/2002 |
| WO | 0237219 A2 | 5/2002 |

OTHER PUBLICATIONS

Rahimi, A., et al., "A Robust and Energy-Efficient Classifier Using Brain-Inspired Hyperdimensional Computing", SLPED '16, Aug. 8-10, 2016, 6 pages, San Francisco Airport, CA, USA.

List of IBM Patents or Patent Applications Treated as Related dated Oct. 13, 2021, 2 pages.

Office Action dated Feb. 15, 2024 received in U.S. Appl. No. 17/465,367, copy not enclosed.

Office Action dated Jul. 22, 2022 received in U.S. Appl. No. 17/465,367, copy not enclosed.

* cited by examiner

| Location ID | Date | Vendor Name | Product Type | Item Amount | Customer First Name | Customer Last Name | 2nd Party First Name | 2nd Party Last Nme |
|---|---|---|---|---|---|---|---|---|
| 800 | 1/1/2014 | UniGram | ACH RECEIVE | 12,387.71 | James | Culley | James | Dewitt |
| 19 | 1/3/2014 | UniGram | CHK CARD POS | 474.98 | James | Culley | Anna | Erickson |
| 2262 | 1/3/2014 | UniGram | CHK CARD POS | 4,400 | James | Culley | Jimmy | Madrid |
| 2262 | 1/4/2014 | UniGram | CHK CARD POS | 3,856.55 | James | Culley | Anna | Erickson |
| 479 | 2/1/2014 | UniGram | ACH RECEIVE | 12,387.71 | James | Culley | Gennie | Walkup |
| 3277 | 2/2/2014 | UniGram | CHK CARD POS | 4,500 | James | Culley | Jimmy | Madrid |
| 3277 | 2/3/2014 | UniGram | CHK CARD POS | 1,713.91 | James | Culley | Gennie | Walkup |
| 1548 | 6/27/2014 | UniGram | TRANSFER SEND | 8,100 | James | Culley | Willie | Bryant |

FIG. 3

| Location ID | Date | Vendor Name | Product Type | Item Amount | Customer First Name | Customer Last Name | 2nd Party First Name | 2nd Party Last Nme |
|---|---|---|---|---|---|---|---|---|
| 800 | 1/1/2014 | UniGram | ACH RECEIVE | 12,387.71 | James | Culley | James | Dewitt |
| 19 | 1/3/2014 | UniGram | CHK CARD POS | 474.98 | James | Culley | Anna | Erickson |
| 2262 | 1/3/2014 | UniGram | CHK CARD POS | 4,400 | James | Culley | Jimmy | Madrid |
| 2262 | 1/4/2014 | UniGram | CHK CARD POS | 3,856.55 | James | Culley | Anna | Erickson |
| 479 | 2/1/2014 | UniGram | OUTGOING WRE | 12,387.71 | James | Culley | Gennie | Walkup |
| 3277 | 2/2/2014 | UniGram | CHK CARD POS | 4,500 | James | Culley | Jimmy | Madrid |
| 3277 | 2/3/2014 | UniGram | CHK CARD POS | 1,713.91 | James | Culley | Gennie | Walkup |
| 1548 | 6/27/2014 | UniGram | TRANSFER SEND | 8,100 | James | Culley | Willie | Bryant |

FIG. 5

SYSTEMS AND METHODS TO MONITOR TRAINED INTELLIGENCE AGENTS

TECHNICAL FIELD

The present invention relates generally to monitoring trained intelligent agents or bots, for example, to detect drift, including in an aspect injecting test data into the trained intelligent agents.

BACKGROUND

Systems and methods have been developed that use cognitive analytics to help financial institutions, e.g., banks, to detect suspicious activity indicative of money laundering, terrorist financing, and/or fraudulent activity. The cognitive analytics differentiate "normal" financial activities from "suspicious" activities, and use the differentiation information to build a predictive model for financial institutions. One example of a financial crime detection system that uses cognitive analytics to help financial institutions detect suspicious financing is IBM® Financial Crimes Alerts Insight with Watson™. Other cognitive analytical models and methods exist to attack and solve the problem of detecting suspicious financial activity indicative of money laundering, terrorist financing, and other fraudulent activity, and each have their merits and detriments.

Current systems to detect suspicious activity typically rely upon real customer data from financial institutions. The problem with relying on real customer data for analytics is that the data is very difficult to access and use in testing and development environments, due to the sensitive and private nature of the data (personally identifying information (PII), financial behavior information, etc.). In addition, when real data is available, it is finite and its use in creating analytics is limited (difficult to "transfer" to other use cases, or use to predict future, unseen behavior). Past methods to address privacy concerns include data cleansing, anonymizing, or hashing, but these methods further limit the usefulness of the data. It would be advantageous to simulate customer data and generate both normal and suspicious activities for use in developing analytics to detect the types of situations that financial institutions want to detect. It would be further advantageous to produce data that is as realistic as possible, such that the analytics do not just identify the simulation algorithms, but also identify emergent behavior. It would be further advantageous if the trained intelligence agents and machine-learning models could be monitored to detect drift over time.

SUMMARY

The summary of the disclosure is given to aid understanding of, and not with an intent to limit, the disclosure. The present disclosure is directed to a person of ordinary skill in the art. It should be understood that various aspects and features of the disclosure may advantageously be used separately in some circumstances or instances, or in combination with other aspects, embodiments, and/or features of the disclosure in other circumstances or instances. Accordingly, variations and modifications may be made to the system, the architectural structure, and/or methods to achieve different effects. In this regard it will be appreciated that the disclosure presents and describes one or more inventions, and in aspects includes numerous inventions as defined by the claims.

A system, method, and/or computer program product is disclosed for monitoring a trained intelligent agent. A trained intelligent agent in one or more embodiments predicts behavioral patterns, and in an aspect (transactional) activity of one or more persons, e.g., one or more simulated persons (e.g., a set of simulated persons). In one more embodiments, the system, method, and/or computer program product includes a processor and a memory comprising instructions, which are executed by the processor to cause the processor to predict, by the trained intelligent agent, simulated transactional activity of a simulated person (e.g., a set of simulated persons) for a measured period; score the simulated transactional activity for the measured period; inject testing data into the simulated transactional activity for the measured period to form testing transactional activity for the measured period; score the testing transactional activity for the measured period; determine if the score of the simulated transactional activity for the measured period is different than the score of the testing transactional activity for the measured period; and generate, in response to determining that the score of the simulated transaction activity for the measured period is different than the score of the testing transactional activity for the measured period, a report. In an aspect the trained intelligent agent is based upon the transactional activity of a representative person, wherein the representative person comprises a plurality of actual persons that are clustered based upon the transactional activity of the plurality of actual persons via hyper-dimensional clustering. The measured period according to an embodiment is at least one of the group consisting of a time period, a number of transactions, and a combination thereof, and in a preferred embodiment the measured period is twenty-four hours. In an embodiment, scoring the simulated transactional activity for the measured period and scoring the testing transactional activity for the measured period are performed using a policy engine of the provided trained intelligent agent.

In one or more embodiments determining if the score of the simulated transaction activity for the measured period is different than the score of the testing transactional activity for the measured period includes determining if the score of the simulated transactional activity for the measured period is different by at least a threshold from the score of the testing transactional activity for the measured period. Determining if the score of the simulated transactional activity for the measured period is different than the score of the testing transactional activity for the measured period includes in a preferred embodiment comparing the score of the simulated transactional activity for the measured period to the score of the testing transactional activity for the measured period. The threshold in an aspect is at least one of the group consisting of: a selectable threshold, a fixed threshold, a programmable threshold, an adjustable threshold, a predefined threshold, a predetermined threshold, and combinations thereof. In a further aspect, scoring the simulated transactional activity for the measured period includes scoring the simulated transactional activity for the measured period in confidence levels, and alternatively or additionally scoring the testing transactional activity for the measured period in confidence levels. The system, method, and/or computer program product in an aspect further includes: providing a copy of the trained intelligent agent; running the copy of the trained agent for the measured period; and injecting the copy of the trained agent with the testing data to form the testing transactional activity.

The system, method, and/or computer program product in a further embodiment includes, after determining if the score of the simulated transactional activity for the measured period is different than the score of the testing transactional activity for the measured period, predicting, by the trained intelligent agent, the simulated transactional activity of the simulated customer for a second measured period; scoring the simulated transactional activity for the second measured period; injecting additional testing data into the simulated transactional activity for the second measured period to form additional testing transactional activity; scoring the additional testing transactional activity for the second measured period; determining if the score of the simulated transactional activity for the second measured period is different than the score of the additional testing transactional activity for the second measured period; and generating, in response to determining that the score of the simulated transactional activity for the second measured period is different than the score of the additional testing transactional for the second measured period, a report.

The system, method, and/or computer program product in an aspect: predicts, by the trained intelligent agent, simulated activity of a simulated person (or set of simulated persons) for a measured period; scores the predicted simulated activity for the measured period; injects testing data into a copy of the predicted simulated activity for the measured period to form testing activity for the measured period; scores the testing activity for the measured period, preferably using a policy engine of the trained intelligent agent); determines if the score of the predicted simulated activity for the measured period is different than the score of the testing activity for the measured period; and generates, in response to determining that the score of the predicted simulated activity for the measured period is different than the score of the testing activity for the measured period, a report.

The foregoing and other objects, features, and/or advantages of the invention will be apparent from the following more particular descriptions and exemplary embodiments of the invention as illustrated in the accompanying drawings wherein like reference numbers generally represent like parts of the illustrative embodiments of the invention.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. The claims should not be limited to the precise arrangement, structures, features, aspects, systems, platforms, architectures, modules, functional units, assemblies, subassemblies, systems, circuitry, embodiments, programming, methods, processes, techniques, devices and/or details shown, and the arrangements, structures, systems, platforms, architectures, modules, functional units, assemblies, subassemblies, features, aspects, programming, methods, processes, techniques, circuitry, embodiments, devices and/or details shown may be used singularly or in combination with other arrangements, structures, assemblies, subassemblies, systems, platforms, architectures, modules, functional units, features, aspects, programming, circuitry, embodiments, methods, techniques, processes, devices and/or details. Included in the drawings are the following Figures:

FIG. 3 depicts a schematic diagram showing a plurality of simulated transactions, according to embodiments herein;

FIG. 5 depicts a schematic diagram showing according to an embodiment an injected test transaction amongst a plurality of simulated transactions;

DETAILED DESCRIPTION

Figure 1:
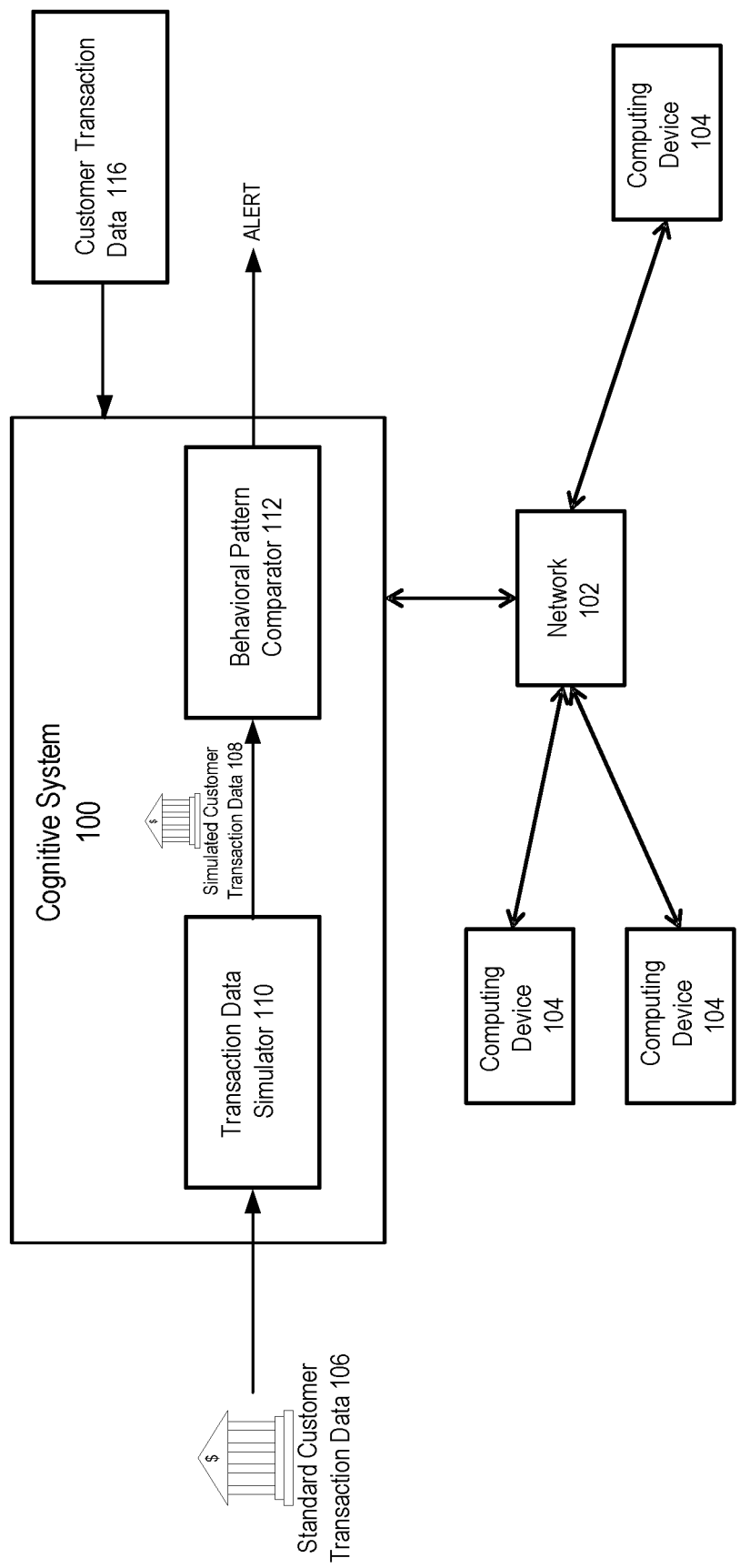
FIG. 1 depicts a schematic diagram of one illustrative implementation of a cognitive system 100 implementing transaction data simulator, and behavioral pattern comparator.

The following description is made for illustrating the general principles of the invention and is not meant to limit the inventive concepts claimed herein. In the following detailed description, numerous details are set forth in order to provide an understanding of the system, method, and/or techniques for monitoring trained intelligent agents, also referred to as trained bots, however, it will be understood by those skilled in the art that different and numerous embodiments of the system and its method of operation may be practiced without those specific details, and the claims and disclosure should not be limited to the features, aspects, arrangements, structures, systems, assemblies, subassemblies, platforms, architectures, modules, functional units, circuitry, embodiments, programming, processes, methods, techniques, and/or details specifically described and shown herein. Further, particular features, aspects, arrangements, structures, systems, assemblies, subassemblies, platforms, architectures, modules, functional units, circuitry, embodiments, programming, methods, processes, techniques, details, etc. described herein can be used in combination with other described features, aspects, arrangements, structures, systems, assemblies, subassemblies, platforms, architectures, modules, functional units, circuitry, embodiments, programming, techniques, methods, processes, details, etc. in each of the various possible combinations and permutations.

The following discussion omits or only briefly describes conventional features of information processing systems and data networks, including computer-implemented cognitive systems, data analytics programs, deep learning, and/or machine learning systems/programming, which should be apparent to those skilled in the art. It is assumed that those skilled in the art are familiar with data extraction, cleaning, transforming, and processing, as well as data analytics, including large scale cognitive analytics and their operation, and the application of cognitive analytics, including analytics systems and processes to monitor and detect suspicious financial activity. It may be noted that a numbered element is numbered according to the figure in which the element is introduced, and is typically referred to by that number throughout succeeding figures.

As an overview, a cognitive system is a specialized computer system, or set of computer systems, configured with hardware and/or software logic (in combination with hardware logic upon which the software executes) to emulate human cognitive functions. These cognitive systems apply human-like characteristics to convey and manipulate data at various levels of interpretation which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

- Navigate the complexities of human language and understanding
- Ingest and process vast amounts of structured and unstructured data
- Generate and evaluate hypotheses
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection (memorization and recall) from data points (images, text, voice)
- Predict and sense with situation awareness that mimics human cognition based on experiences
- Answer questions based on natural language and specific evidence In one aspect, the cognitive system techniques can be applied to create a transaction data simulator, which can simulate a set of transaction data from a financial institution, e.g., a bank. The simulated transaction data, even if it is not "actual" transaction data, e.g., actual customer transaction data, from the financial institution, can be used to train the predictive (cognitive) model for example to identify suspicious activity indicative of financial crimes. Raw or real (e.g., customer) transaction data can also be used to train, tune, or validate the predictive model, e.g., the trained intelligent agent.

The transaction data simulator combines a multi-layered unsupervised clustering approach with a semi-interactive reinforcement learning (sIRL) model to create a large set of intelligent agents, also referred to as "trained bots", that have learned to behave like a wide range of persons interacting with and/or performing transactions with financial institutions.

In an embodiment, the multi-layered unsupervised clustering approach creates a large set of varying representative sets of transactions (e.g., extracted from real transaction data provided by a financial institution), using information including hundreds of attributes of persons, e.g., customers, over varying lengths of time. Each set of the sets of transactions can be associated with a group of persons having similar transaction characteristics. A trained intelligent agent or trained bot, in an embodiment generates an artificial profile, e.g., an artificial customer profile, and selects one of a number of sets of transaction behaviors of people to be combined with a generated artificial profile. In this way, the intelligent agent or trained bot can simulate that set of persons, and learn to behave as though it were a person that would have fit into that set of persons. The intelligent agent or trained bot is then provided with a period of time (e.g., five years), during which the intelligent agent can observe the person's data within a controlled environment, e.g., past behaviors of the represented set of persons, and learn to perform "simulated" transactions, which are similar to standard transactions (behavior) of the represented set of standard persons.

The sets of transactions in one or more embodiments can include a number of factors, where the factors can be statistic data or otherwise arithmetically derived. For example, the transaction amount of a particular product and account within a set of transactions can be a particular value or represented as a range of values, e.g., the transaction amount of the sets of transactions is $20-$3,000. The transaction location of a set of transactions can be provided statistically, e.g., 30% of transaction locations are shopping malls, 50% of transaction locations are restaurants, and 20% of transaction locations are gas stations. The transaction type of a set of customer transactions can be provided statistically, e.g., 20% of transaction types are check payment, 40% of transaction types are POS payment, 25% of transaction types are ATM withdrawal, and 15% of transaction types are wire transfer. The transaction medium of a set of transactions can be provided statistically, e.g., 15% of transaction mediums are cash, 45% of transaction mediums are credit card, 25% of transaction mediums are checking accounts, and 15% of transaction mediums are PayPal®.

In an embodiment, a large number of artificial profiles (e.g., customer profiles) are generated from a plurality of real person profile data. The real person profile data can be provided by one or more financial institutions. Each real person profile (e.g., real customer profile) can include an address of a person; a name of a person (the person can be a legal entity or individual); contact information such as a phone number, an email address, etc.; credit information, such as a credit score, FICO score, a credit report, etc.; income information (e.g., an annual revenue of a legal entity, or a wage of an individual), and the like. The real person profile data is stored under different categories. For example, institutional or commercial customers (i.e., legal entities) can be divided into different categories based on the size, product, or service of the commercial customers. An artificial profile can be generated by randomly searching all the real person profile data. For example, an artificial person profile can be generated by combining randomly selected information including address, first name, second name, phone number, email address, credit score, revenue or wage, etc. Thus, the generated artificial person profile extracts different pieces of information from real person profile data, and thus looks like a realistic person profile. Financial transaction data is further simulated and associated with each artificial person profile. In an embodiment, the simulated person transaction data can be combined with an artificial person profile to form simulated customer data.

FIG. 1 depicts a schematic diagram of one illustrative embodiment of a cognitive system 100 implementing transaction data simulator 110, and a behavioral pattern comparator 112. The cognitive system 100 is implemented on one or more computing devices 104 (comprising one or more processors and one or more memories, and potentially any other computing device elements generally known in the art including buses, storage devices, communication interfaces, and the like) connected to computer network 102. The computer network 102 typically includes multiple computing devices 104 in communication with each other and with other devices or components via one or more wired and/or wireless data communication links, where each communication link comprises one or more of wires, routers, switches, transmitters, receivers, or the like. Other embodiments of the cognitive system 100 may be used with components, systems, sub-systems, and/or devices other than those that are depicted herein. The computer network 102 can include local network connections and remote connections in various embodiments, such that the cognitive system 100 can operate in environments of any size, including local and global environments, e.g., through the Internet.

The cognitive system 100 in one or more embodiments is configured to implement transaction data simulator 110 that can simulate or intake sets of transaction data 106, e.g., customer transaction data 106. In an embodiment, the cognitive system 100 and/or transaction data simulator 110 also can intake transaction data 116, e.g., customer transaction data 116. The transaction data simulator 110 can generate a large set of simulated transaction data 108 based on the set of transaction data 106 and/or transaction data 116, so that the simulated transaction data 108, e.g., simulated customer transaction data 108, looks like real transaction data. The translation data simulator 110 can generate a large set of simulated transaction data 108 based upon the transaction data 116 and/or set of transaction data 106. The simulated transaction data 108 in an embodiment is then combined with a randomly selected artificial profile, so that complete simulated profile data for a simulated person, e.g., simulated customer, is obtained.

In an embodiment, the set of transaction data 106 is obtained through an unsupervised clustering approach. Raw data including a large amount of transaction data 116 is provided by one or more banks, and a large set of small groups representing different characteristics of bank customers are clustered or grouped from the raw data through an unsupervised clustering approach. Each small group includes transaction data from persons having similar characteristics. For example, group A represents persons who are single attorneys practicing patent law in New York, while group B represents persons who are married attorneys practicing commercial law in New York.

In an aspect, trained intelligent agents, also referred to as a trained bots, are run to predict transactions of a person (or clustered group of persons) to create simulated behavior. In an embodiment, data, e.g., testing transactional data, is injected and used by the trained intelligent agent in order to measure how well the trained intelligent agent reacts to and/or scores the non-real information injected into the trained intelligent agent. The trained intelligent agent is run using the injected testing transaction data and generates "testing behavior" based upon the injected testing transaction data. The "simulated" behavior of the trained intelligent agent can be compared and contrasted with the "testing" behavior of the trained intelligent agent injected with the testing data to measure how well the trained intelligent agent reacts and/or scores the non-real testing data. The trained intelligent agent's ability to recognize non-real information as not a fit for its own simulated behavior patterns, as well as the trained intelligent agent's ability to adapt and/or adjust to the testing data in a way consistent with its own unique personality and profile, are measures that can help identify whether a model is drifting over time.

In one or more embodiments, an existing trained intelligent agent is run in parallel with a copy of the trained intelligent agent that in an embodiment has been periodically injected with testing data. Confidence scores, levels or intervals of the simulated behavior in one or more embodiments are generated, produced, and/or output by the trained intelligent agent. Confidence scores, levels or intervals of the "testing behavior" are generated, produced and/or output by the copy of the trained intelligent agent running with the injected testing data. The confidence scores of the unadulterated trained intelligent agent and the confidence scores of the trained intelligent agent copy injected with testing data can be compared for deviations suggesting model drift or deviance. In an aspect, if the confidence scores/levels of the unadulterated model using simulated data, e.g., set of persons (or clustered persons), deviates by a threshold from the confidence scores/levels of the trained intelligent agent copy using the testing data, then such deviation beyond a threshold could be indicative of model drift.

In one or more aspects, the systems and/or methods capitalize on existing infrastructure, used to generate and develop "simulated" behavior. An approach to reinforced intelligent agent training to measure model drift is presented. In an embodiment, a Behavioral Pattern Comparator 112 is also implemented in the Cognitive System 100. The Behavioral Pattern Comparator 112 can compare the simulated transaction data 108 provided by the transactional data simulator 110, and more particularly the predicted behavior of a simulated person as generated and/or represented by a trained intelligent agent, also referred to as a trained bot, can be compared to the "testing" behavior of a copy of the trained intelligent agent injected with testing data. For example, in one or more embodiments, a trained intelligent agent simulates or predicts "simulated" behavior; a copy of the trained intelligent agent is injected with testing transaction data and the trained intelligent agent copy is run to provide "testing" behavior; the "simulated" behavior of the trained intelligent agent is compared to the "testing" behavior of the trained intelligent agent copy in the Behavior Pattern Comparator 112. In an embodiment, if the confidence score/level of the "simulated" behavior of the actual trained intelligent agent deviates from the confidence score/level of the "testing" behavior of the trained intelligent agent copy, then an alert can be generated that drift or other deviation needs to be considered, reviewed, and/or acted upon.

Injecting testing transactional data into a copy of the trained intelligent agent provides in an embodiment reinforced intelligent agent training to measure model drift that capitalizes on existing infrastructure developed to simulate behavior and data. In one or more embodiments, an existing trained intelligent agent is run in parallel with a copy of the trained intelligent agent that has a mechanism to inject data, e.g., testing data, for example on a periodic or other basis. The trained intelligent agent in an aspect generates confidence scores for both the simulated behavior of the unadulterated trained intelligent agent and the testing behavior of the copy of the trained intelligent agent that used the injected testing data. The confidence scores of the unadulterated trained intelligent agent and the copy of the trained intelligent agent injected with testing data are compared for deviation thresholds, for example, that can suggest model/trained intelligent agent drift.

The Behavior Pattern Comparator 112 has instructions, logic, and algorithms that when executed by a processor, cause the processor to perform the actions and operations discussed in connection with the Behavioral Pattern Comparator 112. While the Behavior Pattern Comparator 112 has been shown as a separate module in Cognitive System 110, it can be appreciated that Behavior Pattern Comparator 112, or the activities and actions performed by the Behavior Pattern Comparator 112 can be part of and/or integral with the Transaction Data Simulator 110.

Figure 2:
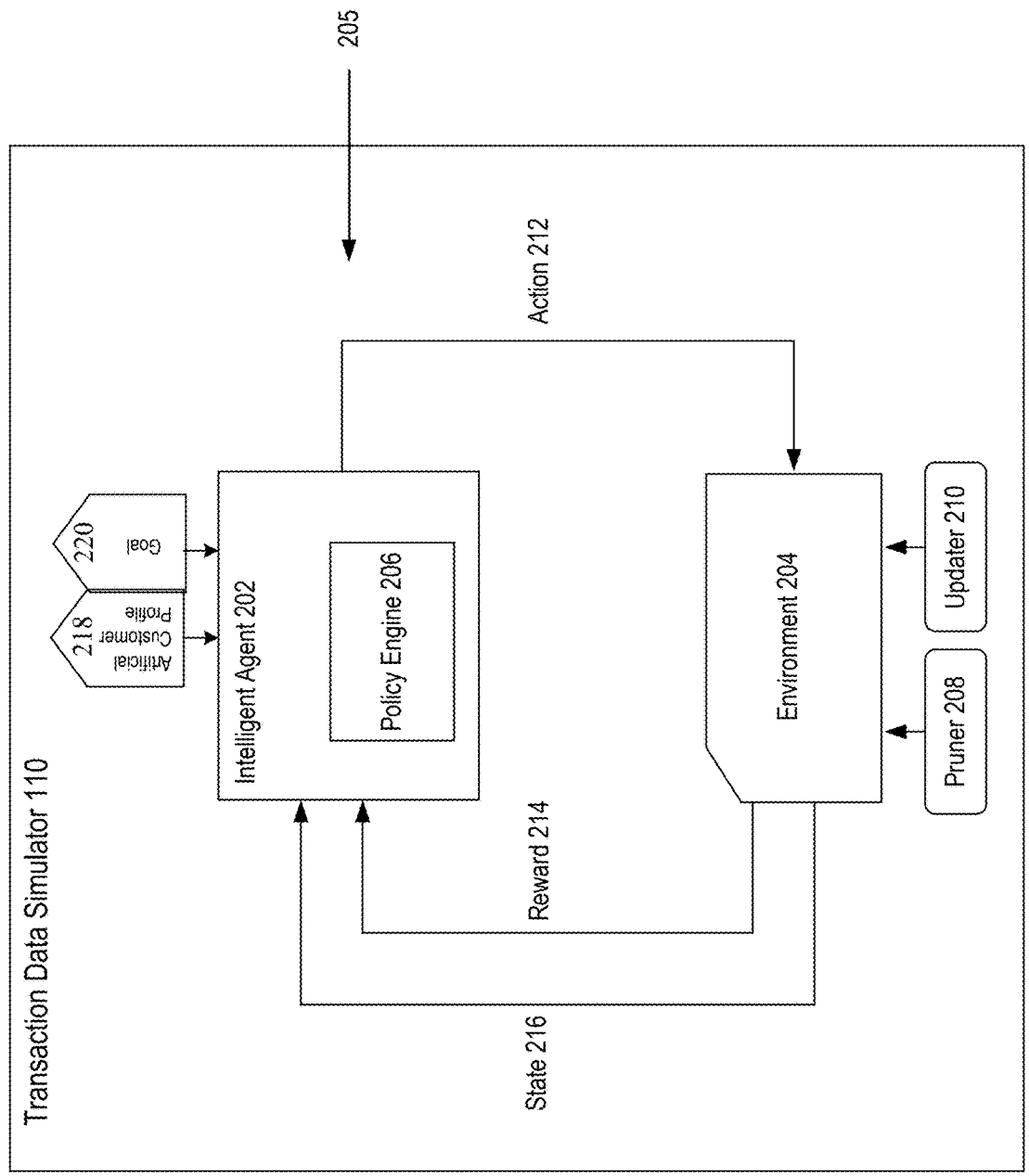
FIG. 2 depicts a schematic diagram of one illustrative embodiment of a transaction data simulator 110.

FIG. 2 depicts a schematic diagram of one illustrative embodiment of the Transaction Data Simulator 110. The transaction data simulator 110 utilizes reinforcement learning techniques to simulate financial transaction data. The transaction data simulator 110 includes intelligent agent 202, and environment 204. The intelligent agent 202 randomly selects a derived standard transaction behavior 220 (e.g., goal 220) representing a set of "persons", e.g., "customers", having similar transaction characteristics, and associates the standard transaction behavior with a randomly selected artificial profile 218. The intelligent agent 202 outputs, determines, and/or takes an action 212 in each iteration. In this embodiment, the action 212 taken in each iteration includes determining whether any transactions will be conducted on a single day, e.g., twenty-four hours, and if so, conducting a plurality of transactions on that day. The iteration then continues onto the next day in the series. Each transaction has the transaction information including transaction type (e.g., Automated Clearing House (ACH) transfer, check payment, wire transfer, Automated Teller Machine (ATM) withdrawal, Point of Sale (POS) payment, etc.); transaction amount; transaction time; transaction location; transaction medium (e.g., cash, credit card, debit card, PayPal®, checking account, etc.); the second party who is related to the transaction (e.g., a person who receives the wire transferred payment), and the like.

The environment 204 takes the action 212 as input, and returns reward 214, also referred to as feedback, and state 216 from environment 204 as the output. The reward 214 is the feedback that measures the relative success or failure of the action 212. In an embodiment, the environment 204 compares the action 212 with goal 220 (e.g., standard transaction behavior). If the action 212 deviates from the goal 220 beyond a threshold, then the intelligent agent 202 is penalized relative to the deviation, while if the action 212 is within a threshold of the goal 220 (i.e., the action 212 is similar to the goal 220), the intelligent agent 202 is rewarded. This can include even the decision by the intelligent agent as to whether or not to conduct transactions at all on a given day. The threshold can be predefined, predetermined, selectable, adjustable, programmable, and/or learned. The action 212 is effectively evaluated, so that the intelligent agent 202 can improve the next action 212 based on the reward 214. In this embodiment, the environment 204 is a set of all prior actions taken by the intelligent agent 202, i.e., the environment 204 is a set of all prior simulated transactions. The intelligent agent 202 observes the environment 204, and gets information about the prior transactions, e.g., the number of transactions that have been made within a day, a week, a month, or a year; each transaction amount, account balance, each transaction type, and the like. The policy engine 206 can adjust the policy based on the observations, so that the intelligent agent 202 can take a better action 212 in the next iteration.

The intelligent agent 202 in an aspect includes policy engine 206, configured to adjust a policy based on the state 216 and the reward 214. The policy is a strategy that the intelligent agent 202 employs to determine the next action 212 based on the state 216 and the reward 214. The policy is adjusted, aiming to get a higher reward 214 for the next action 212 taken by the intelligent agent 202. The policy includes a set of different policy probabilities or decision-making probabilities which can be used to decide whether a transaction is going to be performed in a particular day or not, the number of transactions per day, transaction amount, transaction type, transaction party, etc.

In reinforcement learning model, outcome of events are stochastic, and a random number generator (RNG) is a system that generates random numbers for use in the stochastic model. In an example, the maximum number of transactions per day is 100, and the maximum transaction amount is $15 million. In the first iteration, a random transaction with transaction amount of $15 million to Zimbabwe is made by the intelligent agent 202. This action 212 deviates far from the goal 220 (e.g., transaction made by married attorneys practicing commercial law in New York), and thus this action 212 is penalized (i.e., the reward 214 is negative). The policy engine 206 is trained to adjust the policy, so that a different transaction which is closer to the goal 220 can be made. A RNG and a stochastic model is used in reinforcement learning because it facilitates and enables the policy to allow "exploration" by the intelligent agent, rather than getting "stuck" on simple transaction generation patterns that barely avoid penalty in the feedback system. With more iterations, transactions which are similar to the goal 220 can be simulated by the "smarter" policy engine 206. As shown in FIG. 3, a plurality of transactions from the person "James Culley" are simulated.

As shown in FIG. 2, in an embodiment, one feedback loop (i.e., one iteration) corresponds to one "day" of actions (i.e., one "day" of simulated transactions). During a period of time, e.g., ten years, the intelligent agent 202 learns how to take an action 212 to get a reward 214 as high as possible. The number of iterations corresponds to the duration of time. For example, ten years correspond to 10×365=3650 iterations. Semi-supervised human interaction 205 can observe and judge the actions 212 by the results that the actions 212 produce, at varying preset intervals, e.g., 10,000 iterations. It is goal 220 oriented, and its aim is to learn sequences of actions 212 that will lead the intelligent agent 202 to achieve its goal 220, or maximize its objective function.

In an embodiment, the transaction data simulator 110 further includes updater 210. A new action 212 is performed in each iteration. The updater 210 updates the environment 204 with the action 212 taken by the intelligent agent 202 after each iteration. The action 212 taken in each iteration is added into the environment 204 by the updater 210. In an embodiment, the transaction data simulator 110 further includes pruner 208, configured to prune the environment 204. In an embodiment, the pruner 208 can remove one or more undesired actions. For example, actions 212 which are taken in the first ten iterations are removed, because these ten iterations deviate far from the goal 220, and the degree of similarity is below a predefined threshold. In another embodiment, a full re-initialization of the transaction data simulator 110 can be performed to remove all the accumulated actions in the environment 204, so that the intelligent agent 202 can start over again.

Figure 4:
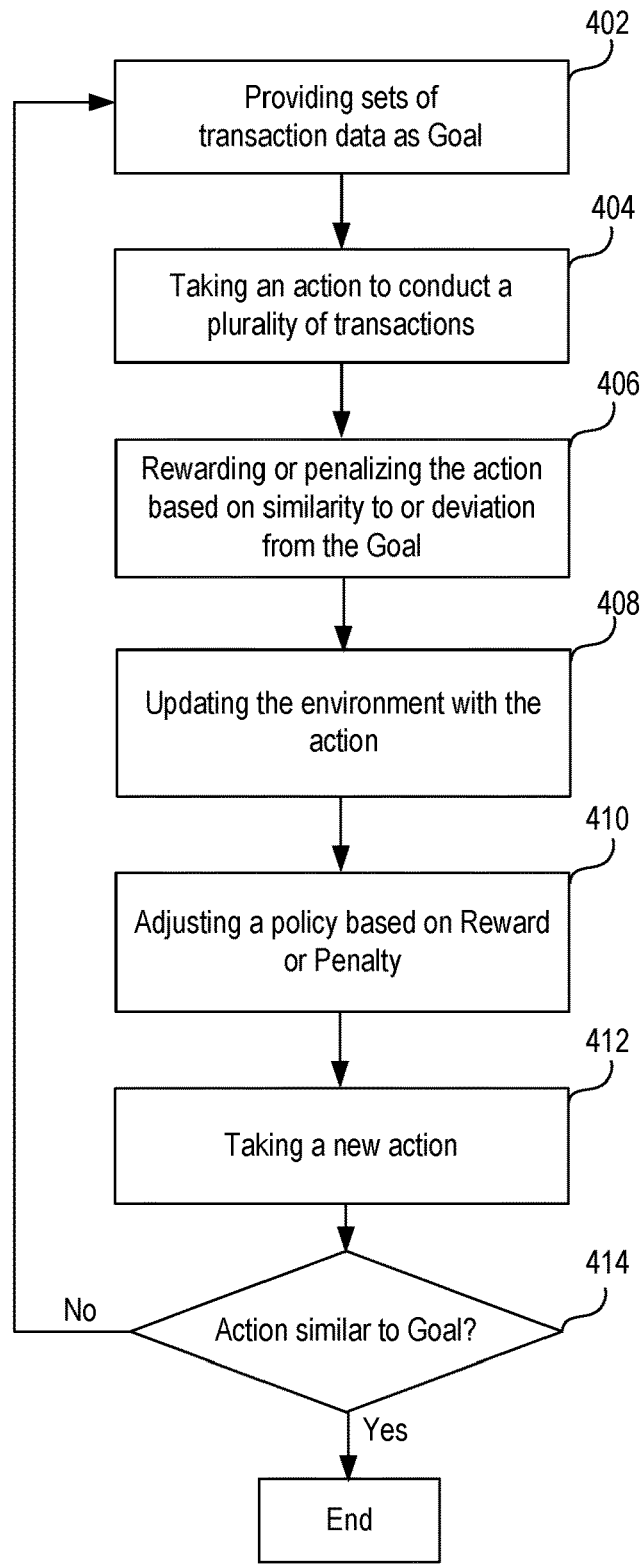
FIG. 4 illustrates a flow chart of one illustrative embodiment of a method 400 of training an intelligent agent.

FIG. 4 illustrates a flow chart of one illustrative embodiment showing a method 400 of training an intelligent agent to produce simulated or predicted transaction data. While the method 400 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 4, but the process may be integrated and/or one or more steps may be performed together, simultaneously, or the steps may be performed in the order disclosed or in an alternate order.

At step 402, sets of transaction data are provided as goal 220. The sets of transaction data represent a group of persons having similar transaction characteristics. The sets of transaction data, e.g., transactions, are obtained through an unsupervised clustering approach.

At step 404, an action 212 is taken to conduct for example, one or more transactions in an iteration, e.g., 100 transactions per iteration. Each iteration can represent a time period, e.g., a single day. Other time periods are contemplated. Each transaction has the transaction information including transaction type, transaction amount, transaction time, transaction location, transaction medium, the second party who is associated with the transaction (if applicable), and the like.

At step 406, the environment 204 compares the goal 220 with the action 212 taken in this iteration, rewards or penalizes the action 212 based on its similarity to or deviation from the goal 220. The threshold or rule to decide whether the action 212 is similar to the goal 220 or not, is predefined, and can be adjusted based on how similar to the goal 220 the user prefers. The threshold can be predetermined, predefined, fixed, programmable, adjustable, and/or machine learned.

At step 408, the environment 204 is updated to include the action 212, e.g., the one or more transactions, in the present iteration. The environment 204 includes a set of all prior actions.

At step 410, the policy engine 206 adjusts a policy for determining the next action 212 based on the reward 214 (i.e., reward or penalty). The policy is made based on a variety of factors, e.g., probability of occurrence of a transaction, the number of transactions per day, transaction amount, transaction type, transaction party, transaction frequency of each transaction type, an upper bound and a lower bound for each transaction, transaction medium, and the like. The policy can adjust weights of these factors based on the reward 214 in each iteration.

At step 412, in a new iteration, the intelligent agent 202 takes a new action 212. The steps 404 to 412 are repeated until the action 212 is similar enough to the goal 220 (step 414). For example, the transaction amount specified in the goal 220 is $20-$3000. If the transaction amount of each transaction in the action 212 falls within the range of $20-$3000, then the action 212 is similar enough to the goal 220. A further optional step can include combining the artificial profile with the last action 212 including a plurality of transactions similar enough to the goal, so that simulated data (e.g., person/customer behavior) is generated. In this manner a trained intelligent agent, e.g., a trained bot, is produced and/or generated.

Since the set of transaction data 106 can include abnormal data, e.g., a fraudulent transaction, the simulated transaction data 108 may also include abnormal data, because the simulated transaction data 108 is similar to the set of transaction data 106. In a reinforcement learning model, the intelligent agent 202 explores the environment 204 randomly or stochastically, learns a policy from its experiences, and updates the policy as it explores to improve the simulated behavior (i.e., transaction data) of the intelligent agent 202. In an embodiment, a behavioral pattern (e.g., spending "splurges" until running out of savings, or experiencing "buyer's remorse" on one big purchase, etc.), as opposed to random actions, may emerge during RNG based exploration. An abnormal behavioral pattern may indicate a fraudulent transaction. For example, a simulated person James Culley may generally make transactions having a transaction amount below $1,000. Suddenly, there is a transaction having a transaction amount of $5,000, and this suspicious transaction may be a fraudulent transaction (e.g., the credit card of James Culley is stolen, or the checking account of James Culley is hacked).

There is a behavioral pattern that naturally emerges or occurs during exploration. For example, as shown in FIG. 3, the simulated person James Culley received an amount of $12,387.71 in a checking account on Jan. 1, 2014. James Culley spent $474.98 on Jan. 3, 2014; spent $4,400 on January 3; and spent $3,856.55 on Jan. 4, 2014 through a debit card associated with the checking account. In the next month, James Culley received an amount of $12,387.71 in the checking account on Feb. 1, 2014, spent $4,500 on Feb. 2, 2014 and $1,713.91 on February 3 through the debit card associated with the checking account, and transferred $8,100 out of the checking account on Jun. 27, 2014. In this example, this simulated person James Culley has a tendency of save-and-spend, and occasionally has a big purchase. The behavioral pattern makes this simulated person James Culley behave more realistically (i.e., look more like a real customer, rather than a robot). A plurality of parameters, such as "behavioral consistency" (the degree of behavioral consistency in a period of time), "consistency volatility" (frequency of behavior change), "behavior abnormality" (deviation from regular transaction behaviors), etc., are generated according to the policy engine 206, and used to show a different personality or behavioral pattern or emergent properties of each simulated person.

In one or more embodiments, a trained intelligent agent is provided that generates "simulated" behavior, e.g., predicts new transaction records for a simulated person; a copy of the trained intelligent agent is provided that is injected with testing transaction data that runs in parallel with the trained intelligent agent and generates "testing" behavior; the "simulated" behavior is compared to the "testing" behavior predicted and produced by the copy of the trained intelligent agent; and deviations between the "simulated" behavior and "testing" behavior are noted. The method and/or approach to monitoring trained intelligent agents in one or more embodiments capitalizes on existing infrastructure (e.g., trained agent models on clustered behavior groups) developed to simulate behavior and transactions of persons, including simulated data across a consortium of organizations. In an aspect, existing infrastructure, e.g., trained intelligent agents are run to predict transactions of a simulated person (or clustered group of persons) in parallel with a copy of the trained intelligent agent that is injected with testing data. Confidence scores, levels, or intervals of simulated behavior generated by the trained intelligent agent in one or more embodiments are compared to confidence scores, levels, or intervals of the predicted/simulated behavior developed by the copy of the trained intelligent agent ("training" behavior") to determine deviation and or drift in the models. In an aspect, the unadulterated intelligent agent is used to write confidence scores on both the "simulated" behavior and the "testing" behavior used in the comparison.

In an aspect, a method and/or mechanism is provided to inject testing data, e.g., financial transaction data, into the copy of the trained intelligent agent. In an aspect, the new "testing" data can be injected at set periodic intervals or at random. In one or more embodiments, abnormal testing data is injected into the copy of the trained intelligent agent to determine if the intelligent agent can recognize unreal (false) data or information that is not a fit for its own simulated behavior parameters. Abnormal testing data in an aspect would be considered data outside the simulated behavior parameters. In other circumstances, real testing data is injected to adapt and/or adjust the trained intelligent agent's behavior in a manner consistent with its own unique personality. In an embodiment, injecting testing data ("testing" behavior), and in an aspect the type of injected testing data within or outside norms can help to identify whether a model is drifting over time.

FIG. 5 depicts a schematic diagram showing an injected transaction amongst a plurality of simulated transactions, according to an embodiment of the disclosure. For example, as shown in FIG. 5, data pertaining to entry location ID 479 on Feb. 1, 2014 indicating an outgoing wire of $12,387.71 has been injected with other transaction data generated/predicted by the trained intelligent agent. This is contrasted with the transaction shown in FIG. 3, where on Feb. 1, 2014, corresponding to entry location ID 479, the simulated person James Culley received an amount of $12,387.71 in a checking account.

Figure 6:
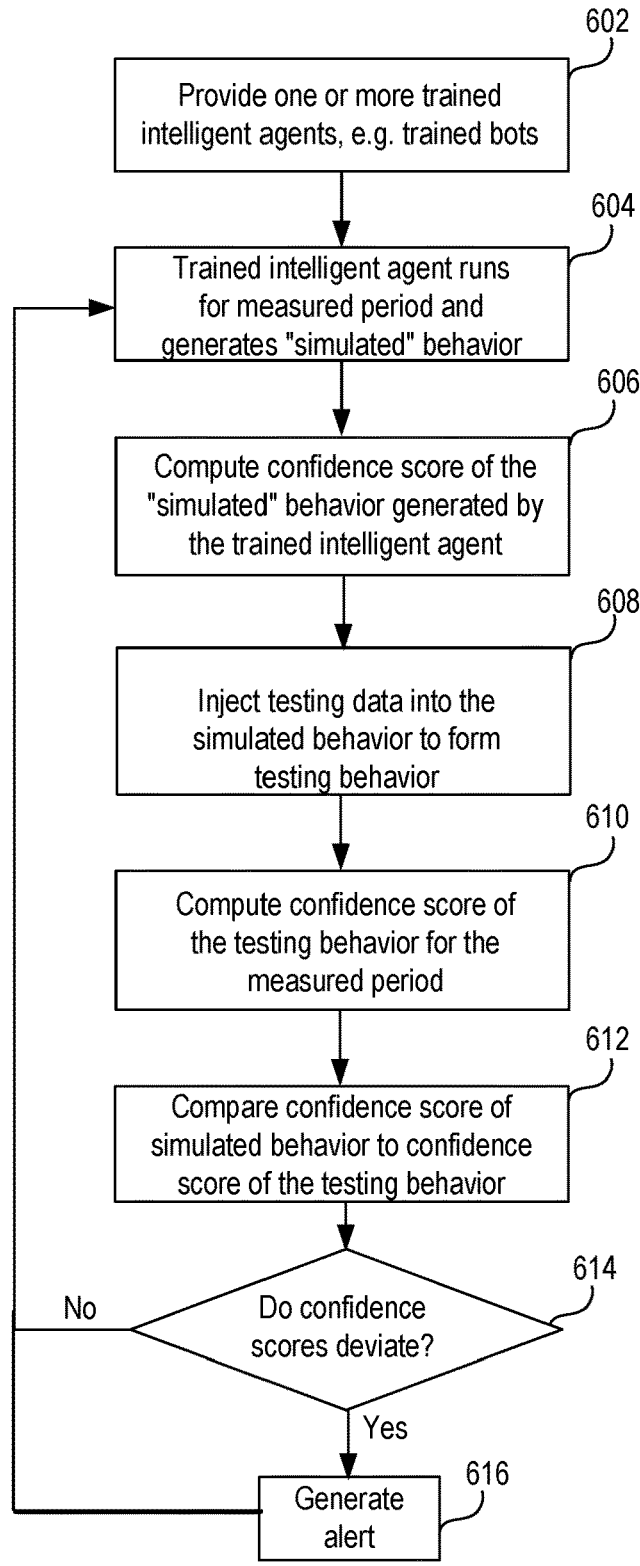
FIG. 6 illustrates a flow chart of an illustrative embodiment showing a method 600 of monitoring trained intelligent agents, including in an aspect injecting test data into a trained intelligent agent.

FIG. 6 illustrates a flow chart of an illustrative embodiment showing a method 600 of monitoring a trained intelligent agent, e.g., a trained bot, for example to detect drift. While the method 600 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 6, but the process may be integrated and/or one or more steps may be performed together, simultaneously, or the steps may be performed in the order disclosed or in an alternate order.

In one or more embodiments, one or more trained intelligent agents, e.g., trained bots, are provided at 602. The trained intelligent agents can be provided according to the method 400 of FIG. 4, or according to a number of different methods and techniques. The process 600 is not limited by the manner in which the intelligent agent is trained or provided, and in an embodiment the manner of providing the trained intelligent agent is not determinative so long as the general environment and system inputs and outputs are standardized. Each trained intelligent agent, in an example, is intended to predict and/or simulate transactional activity, e.g., financial transactional activity, of a simulated person, e.g., a simulated customer. The trained intelligent agent can be trained for other purposes, environments, and/or conditions to predict behavior, including for example to predict handling of insurance claims and/or other activities and behavior patterns of persons. The trained agent in one or more embodiments can be fine-tuned or transferred to other environments.

At 604, the trained intelligent agent runs and simulates the behavior of a set of persons (or clustered persons). In one or more embodiments, the trained intelligent agent runs and provides simulated behavior (e.g., predicted behavior of its set of persons) over a measured period, for example a period of time, a number of transactions, or a combination of a period of time and a number of transactions. The predicted activity taken for the measured period or iteration, e.g., the day, includes all the information needed to generate transactions, such as, for example, whether a transaction takes place during the time period, how many transactions are generated in the time period; and for each transaction the type, amount, time, location and medium of the transaction. Simulating and/or predicting the behavior, e.g., the transactions, of the simulated set of persons by the trained intelligent agent, in an aspect, is performed in the Transaction Data Simulator 110.

At 606, the trained intelligent agent scores its simulated behavior (e.g., the simulated transactional activity) of the simulated person. In an aspect, the trained intelligent agent scores its predictions with a confidence score and/or at a confidence level. In one or more embodiments, the confidence score of the trained intelligent agent represents a probability or likelihood that the predicted/simulated behavior of the simulated person generated by the trained intelligent agent would be performed. For example, the predicted behavior generated by the paired, intelligent agent could be a confidence score and/or confidence level represented by a numerical score, e.g., an 89, or a numerical range, e.g., 85-89, a percentage, e.g., 89%, a range of percentages, e.g., 85%-90%, or a level, e.g., high, medium, or low. These scores would include a normalization of statistical measures over not only the immediate iteration data, but also over the prior transactions generated, e.g., if there were two prior transactions each of $500 in amount, and a third iteration generated a transaction of $2000, one measure used as a factor in the confidence scoring could be the current "average transaction amount"; in iteration 2, this amount would have been $500, but in iteration 3, this amount would now be $1000. In other words, in one or more embodiments, the trained intelligent agent scores its predictions based upon data generated in the current iteration or measured period, e.g., the trained intelligent agent scores its predictions at the end of the time period, for example, at the end of each day, as well as comparisons to any accessible data generated from the agent's prior iterations. In an aspect, the trained intelligent agent at the end of the day scores its predictions of the simulated behavior of the simulated person with confidence intervals.

At 608, in an embodiment, testing data is injected or inserted into the simulated transactional activity generated by the trained intelligent agent. That testing transactional data is injected or inserted into the transactional activity of the trained intelligent agent undertaken in 606. The injected or inserted testing data can be additional transactional data, deleted transactional data, and/or modified transactional data. In one or more embodiments, the injected testing data or inserted testing data is not real person data or based upon real person data. The injected testing data in one or more aspects is randomly generated, and in an embodiment can be randomly generated to be outside the norms of expected or predicted behavior of the person upon which the trained intelligent agent is based. That is, in an embodiment, unreal transaction data is purposely inserted into the simulated transactional activity of the trained intelligent agent. The injected testing data in an embodiment is inserted for the simulated transactional data for the measured period. In one or more embodiments, the injected testing data can be real data drawn from an alternate set of persons. In other words, the injected testing data is drawn from transactional data generated for a different simulated person or set of simulated persons.

At 610, the "testing" behavior is also scored, e.g., scored with a confidence score, a confidence level, and/or a confidence interval. For example the confidence can be a numeric score, for example "89"; a confidence level out of low, medium, or high; based upon confidence intervals, expressed for example as percentage intervals (50%-60%, 60%-70%, etc.); or any other manner of scoring the confidence score of the testing behavior. In one or more embodiments the "testing" behavior with the injected testing data is scored using the trained intelligent agent's policy engine. The testing behavior in one or more aspects is scored for a measured period, and in an embodiment is scored using the trained intelligent agent's policy engine as though the trained intelligent agent itself generated the data during an iteration. In one or more embodiments, the measured period over which the simulated behavior is measured is the same measured period as the testing behavior. In one or more embodiments, the simulated behavior is scored over a measured period, e.g., a day, with a confidence score and/or at a confidence level, and in an aspect can include statistics from the current iteration or statistics derived from all prior iterations available in the environment (e.g., prior transactions generated by the intelligent agent).

At 612, in an embodiment, the confidence score and/or confidence interval of the simulated behavior provided or generated by the trained intelligent agent is compared to the confidence score and/or confidence level of the testing behavior, e.g., formed by injecting testing data.

At 614, it is determined whether the confidence score and/or confidence level of the simulated behavior produced by the trained agent has deviated from the confidence score and/or confidence level of the testing behavior, formed by injecting testing data, e.g., unreal, additional, deleted, and/or modified data. In one or more embodiments, at 614, it is determined whether the confidence score and/or confidence level of the simulated behavior has deviated by a threshold, e.g., by at least a threshold, from the confidence score and/or confidence level of the testing behavior. In an aspect, the threshold can be fixed, predetermined, predefined, selectable, adjustable, random, programmable, and/or machine learned.

If at 614, the confidence score and/or level of the simulated behavior, in an aspect as determined by the trained intelligent, is within acceptable levels, e.g., does not deviate from the confidence score and/or level of the testing behavior, in an embodiment according to preset threshold parameters (614: No), then the trained intelligent agent likely has not drifted. In an embodiment, if at 614, the difference between the confidence score and/or confidence level of the simulated behavior and the confidence score and/or confidence level of the testing behavior is within a threshold (614: No), then the process 600 continues back to 604, where the process 600 continues to monitor the trained intelligent agent. For example, if the threshold is 10%, and the difference between the confidence score of the simulated behavior and the confidence score of the testing behavior is less than 10%, e.g., 9.5%, then the process 600 continues its monitoring process.

If at 614, the confidence score and/or level of the simulated behavior is different than, e.g., deviates from, the confidence score and/or level of the testing behavior (614: Yes), then the trained intelligent agent may have drifted. In an embodiment, if at 614, the difference between the confidence level of the simulated behavior and the confidence score and/or confidence level of the testing behavior is outside the threshold, e.g., deviates beyond a threshold (614: Yes), then at 616 an alert can be generated. The alert or report generated can flag the trained intelligent agent for human-driven investigation. The process 600 at 616 can optionally continue back to 604 and continue to monitor the trained intelligent agent, e.g., where the trained intelligent agent provides simulated behavior, and testing data is injected to provide testing behavior, for example by injecting testing data into the simulated transactional activity generated by the trained agent, in an aspect for another measured period.

Figure 7:
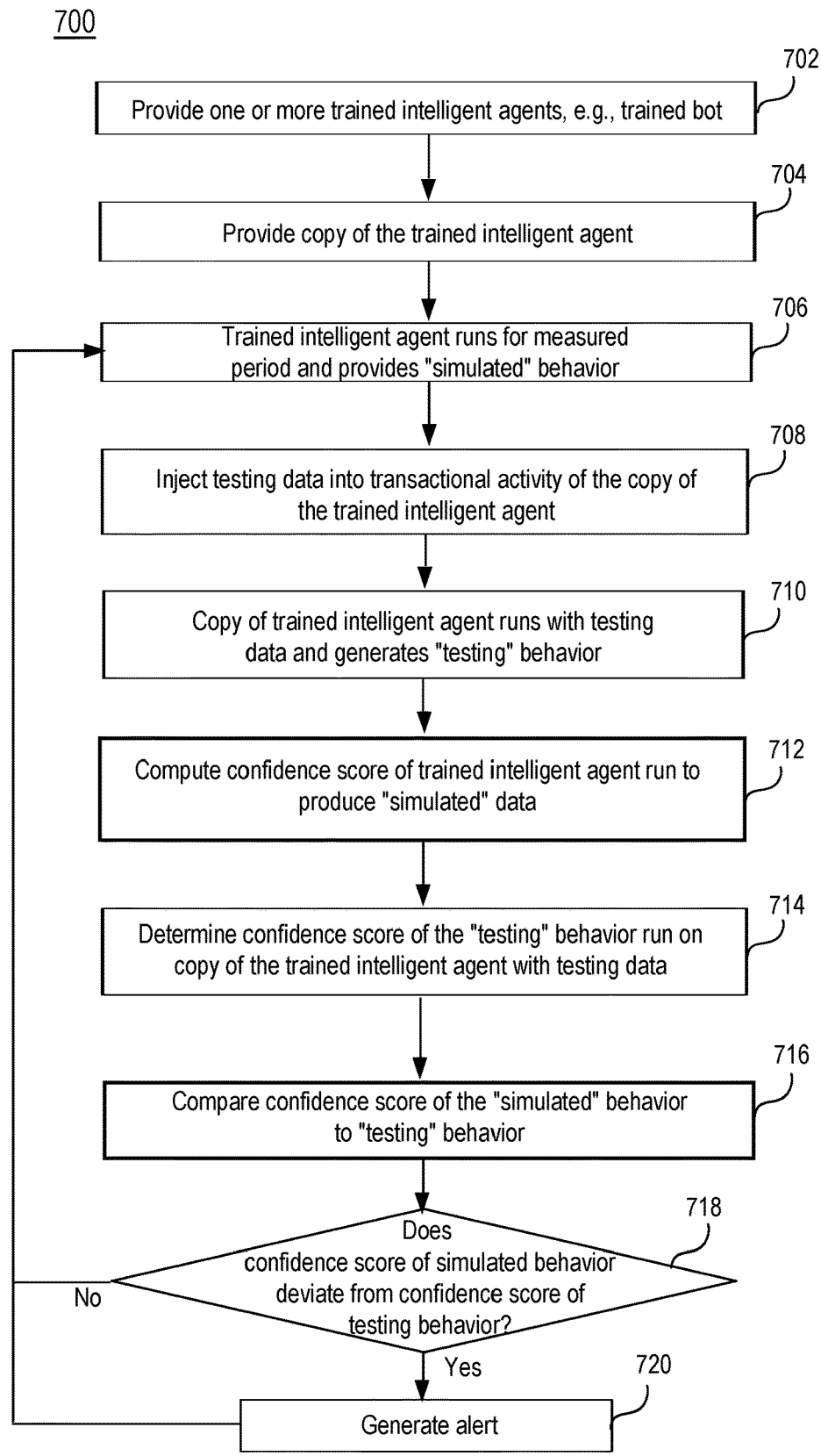
FIG. 7 illustrates a flow chart of another illustrative embodiment showing a method 700 of monitoring trained intelligent agents, including in an aspect injecting test data into a trained intelligent agent.

FIG. 7 illustrates a flow chart of another illustrative embodiment showing a method 700 of monitoring a trained intelligent agent, e.g., a trained bot, for example to detect drift. While the method 700 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 7, but the process may be integrated and/or one or more steps may be performed together, simultaneously, or the steps may be performed in the order disclosed or in an alternate order.

In one or more embodiments, one or more trained intelligent agents, e.g., trained bots, are provided at 702. The trained intelligent agents can be provided according to the method 400 of FIG. 4, or according to a number of different methods and techniques. The process 700 is not limited by the manner in which the intelligent agent is trained or provided. Each trained intelligent agent, in an example, is intended to predict and/or simulate transactional activity, e.g., financial transactional activity, of a simulated person, e.g., a simulated customer. The trained intelligent agent can be trained for other purposes, environments, and/or conditions to predict behavior, including for example to predict handling of insurance claims and/or other activities and behavior patterns. This agent can be fine-tuned or transferred to other environments for predicting behavior. At 704, in one or more embodiments, a copy of the trained agent provided at 702 is made available. This agent can be fine-tuned or transferred to other environments for predicting behavior.

At 706, the trained intelligent agent runs and simulates the behavior of a person (or a set of clustered persons). In one or more embodiments, the trained intelligent agent runs and provides simulated behavior (e.g., predicted behavior of its simulated person or set of clustered persons) over a measured period, for example a period of time, a number of transactions, or a combination of a period of time and a number of transactions. For example, each day the paired trained agent steps through, e.g., undertakes, generates, and/or produces a day's worth of simulated/predicted activity (also referred to as an "iteration"). The predicted activity taken for the iteration, or measured period, e.g., the day, includes all the information needed to generate transactions, such as, for example, whether a transaction takes place during the time period, how many transactions are generated in the time period; and for each transaction the type, amount, time, location and medium of the transaction. Simulating and/or predicting the behavior, e.g., the transactions, of the simulated person by the trained intelligent agent, in an aspect, is performed in the Transaction Data Simulator 110.

At 708, in an embodiment, testing data is injected or inserted into the transactional activity of the copy of the trained intelligent agent. That testing transactional data is injected or inserted into the transactional activity of the trained intelligent agent undertaken in 706 and used by the copy of the trained intelligent agent. The injected or inserted testing data can be additional transactional data, deleted transactional data, and/or modified transactional data. In one or more embodiments, the injected testing data or inserted testing data is not real person (customer) data or based upon real person (customer) data. The injected testing data in one or more aspects is randomly generated, and in an embodiment can be randomly generated to be outside the norms of expected or predicted behavior for the person upon which the trained intelligent agent is based. That is, in an embodiment, testing transaction data is purposely inserted into the transactional activity for the copy of the trained intelligent agent. The injected testing data can be generated based upon a different simulated person or set of simulated persons. The copy of the trained intelligent agent is run at 710 with the injected testing data to provide, generate, and/or produce "testing" behavior. In an embodiment, the copy of the trained agent is run for the measured period.

At 712, the trained intelligent agent scores its simulated behavior (e.g., the simulated transactional activity) of the simulated person. In an aspect, the trained intelligent agent scores its predictions with a confidence score and/or at a confidence level. In one or more embodiments, the confidence score of the trained intelligent agent represents a probability or likelihood that the predicted/simulated behavior of the simulated person generated by the trained intelligent agent would be performed. For example, the predicted behavior generated by the paired, intelligent agent could be a confidence score and/or confidence level represented by a numerical score, e.g., an 89, or a numerical range, e.g., 85-89, a percentage, e.g., 89%, a range of percentages, e.g., 85%-90%, or a level, e.g., high, medium, or low. In one or more embodiments, the trained intelligent agent scores its predictions based upon the time period, e.g., the trained intelligent agent scores its predictions at the end of the time period, for example, at the end of each day. In an aspect, the trained intelligent agent at the end of the day scores its predictions of the simulated behavior of the simulated person with confidence intervals.

At 714, the "testing" behavior of the copy of the trained intelligent agent is also scored, e.g., scored with a confidence score, a confidence level, and/or a confidence interval. For example the confidence can be a numeric score, for example "89"; a confidence level out of low, medium, or high; based upon confidence intervals, expressed for example as percentage intervals (50%-60%, 60%-70%, etc.); or any other manner of scoring the confidence score of the testing behavior of the copy of the trained intelligent agent. In one or more embodiments the "testing" behavior of the copy of the intelligent agent injected with testing data is scored using the trained intelligent agent's policy engine. The testing behavior of the copy of the trained intelligent agent in one or more aspects is scored for a measured period, and in an embodiment is scored using the trained intelligent agent's policy engine, as though the intelligent agent itself had generated the testing behavior/transactions. In one or more embodiments, the measured period over which the simulated behavior is measured is the same measured period as the testing behavior of the copy of the trained intelligent agent. In one or more embodiments, the simulated behavior is scored over one or more measured periods, e.g., a day, or a statistical measurement of all prior iterations/transactions, with a confidence score and/or at a confidence level.

At 716 the confidence score and/or confidence interval of the simulated behavior provided or generated by the trained intelligent agent is compared to the confidence score and/or confidence level of the testing behavior provided or generated by the copy of the trained intelligent agent that has been injected with testing data.

At 718, it is determined whether the confidence score and/or confidence level of the simulated behavior produced by the trained agent has deviated from the confidence score and/or confidence level of the testing behavior of the copy of the trained intelligent agent injected with testing data, e.g., unreal, additional, deleted, and/or modified data. In one or more embodiments, at 718, it is determined whether the confidence score and/or confidence level of the simulated behavior has deviated a threshold, e.g., by at least a certain threshold, from the confidence score and/or confidence level of the testing behavior produced by the copy of the trained intelligent agent that has been injected with testing data. In an aspect, the threshold can be fixed, predetermined, predefined, selectable, random, adjustable, programmable, and/or machine learned, or reset entirely.

If at 718, the confidence score and/or level of the simulated behavior, in an aspect as determined by the trained intelligent agent, is not within acceptable levels, e.g., does not deviate from the confidence score and/or confidence level of the testing behavior, in an embodiment according to preset threshold parameters (718: No), then the trained intelligent agent likely has not drifted. In an embodiment, if at 718, the difference between the confidence score and/or confidence level of the simulated behavior and the confidence score and/or confidence level of the testing behavior by the copy of the trained intelligent agent is within a threshold (718: No), then the process 700 continues back to 706, where the process 700 continues to monitor the trained intelligent agent. For example, if the threshold is 10%, and the difference between the confidence score of the simulated behavior and the confidence score of the testing behavior of the copy of the trained intelligent agent is less than 10%, e.g., 9.5%, then the process 700 continues its monitoring process.

If at 718, the confidence score and/or level of the simulated behavior is different than, e.g., deviates from, the confidence score and/or level of the testing behavior of the copy of the trained intelligent agent (718: Yes), then the trained intelligent agent may have drifted. In an embodiment, if at 718, the difference between the confidence score and/or confidence level of the simulated behavior and the confidence score and/or confidence level of the testing behavior of the copy of the trained intelligent agent is outside the threshold, e.g., deviates beyond the threshold (718: Yes), then at 720 an alert can be generated. The alert or report generated can flag the trained intelligent agent for investigation. The process 700 at 720 can optionally continue back to 706 and continue to monitor the trained intelligent agent, e.g., where the trained intelligent agent provides simulated behavior, and additional testing data is injected into the copy of the trained intelligent agent to provide additional testing behavior, for example by injecting additional testing data into the simulated transactional activity generated by the trained agent, in an aspect for another measured period, e.g., a time period of for example 24 hours.

The Transaction Data Simulator 110 can use abstracted or aggregated real data to simulate data that is representative of real persons, e.g., real customers. The Transaction Data Simulator 110 can provide a large set of simulated data (i.e., simulated transaction data in combination with an artificial profile) that can be used to train a predictive model, e.g., an intelligent agent, to predict customer behavior, or any other number of analytics used for example in the detection and prevention of financial crime. Further, the simulated data can be generated based on abstracted data of the real raw data, rather than the real raw data itself, and in one or more embodiments the simulated data renders it difficult to derive actual transaction actions of any real person to minimize exposing the identify of persons and their transaction data. Additionally, the Transaction Data Simulator 110 allows generation of a behavioral pattern for each simulated persons (e.g., customers) during iterations.

Figure 8:
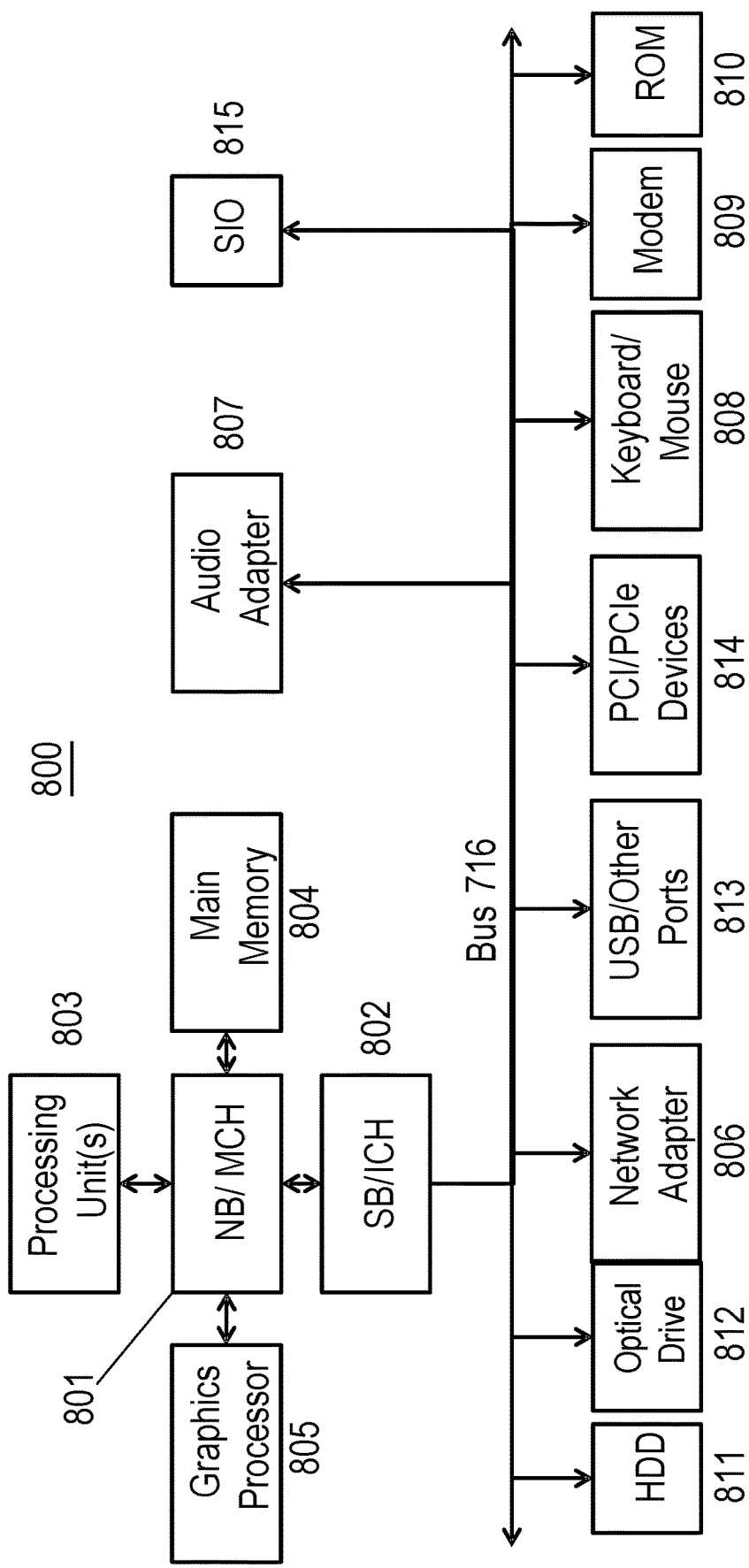
FIG. 8 is a block diagram of an example data processing system 800 in which aspects of the illustrative embodiments may be implemented.

FIG. 8 is a block diagram of an example data processing system 800 in which aspects of the illustrative embodiments are implemented. Data processing system 800 is an example of a computer, such as a server or client, in which computer usable code or instructions implementing the process for illustrative embodiments of the present invention are located. In one embodiment, FIG. 8 represents a server computing device, such as a server, which implements the cognitive system 100 described herein.

In the depicted example, data processing system 800 can employ a hub architecture including a north bridge and memory controller hub (NB/MCH) 801 and south bridge and input/output (I/O) controller hub (SB/ICH) 802. Processing unit 803, main memory 804, and graphics processor 805 can be connected to the NB/MCH 801. Graphics processor 805 can be connected to the NB/MCH 801 through, for example, an accelerated graphics port (AGP).

In the depicted example, a network adapter 806 connects to the SB/ICH 802. An audio adapter 807, keyboard and mouse adapter 808, modem 809, read only memory (ROM) 810, hard disk drive (HDD) 811, optical drive (e.g., CD or DVD) 812, universal serial bus (USB) ports and other communication ports 813, and PCI/PCIe devices 814 may connect to the SB/ICH 802 through bus system 816. PCI/PCIe devices 814 may include Ethernet adapters, add-in cards, and PC cards for notebook computers. ROM 810 may be, for example, a flash basic input/output system (BIOS). The HDD 811 and optical drive 812 can use an integrated drive electronics (IDE) or serial advanced technology attachment (SATA) interface. A super I/O (SIO) device 815 can be connected to the SB/ICH 802.

An operating system can run on processing unit 803. The operating system can coordinate and provide control of various components within the data processing system 800. As a client, the operating system can be a commercially available operating system. An object-oriented programming system, such as the Java™ programming system, may run in conjunction with the operating system and provide calls to the operating system from the object-oriented programs or applications executing on the data processing system 800. As a server, the data processing system 800 can be an IBM® eServer™ System p® running the Advanced Interactive Executive operating system or the LINUX® operating system. The data processing system 800 can be a symmetric multiprocessor (SMP) system that can include a plurality of processors in the processing unit 703. Alternatively, a single processor system may be employed.

Instructions for the operating system, the object-oriented programming system, and applications or programs are located on storage devices, such as the HDD 811, and are loaded into the main memory 804 for execution by the processing unit 803. The processes for embodiments of the cognitive system 100, described herein, can be performed by the processing unit 803 using computer usable program code, which can be located in a memory such as, for example, main memory 804, ROM 810, or in one or more peripheral devices.

A bus system 816 can be comprised of one or more busses. The bus system 816 can be implemented using any type of communication fabric or architecture that can provide for a transfer of data between different components or devices attached to the fabric or architecture. A communication unit such as the modem 809 or the network adapter 806 can include one or more devices that can be used to transmit and receive data.

Those of ordinary skill in the art will appreciate that the hardware depicted in FIG. 8 may vary depending on the implementation. Other internal hardware or peripheral devices, such as flash memory, equivalent non-volatile memory, or optical disk drives may be used in addition to or in place of the hardware depicted. Moreover, the data processing system 800 can take the form of any of a number of different data processing systems, including but not limited to, client computing devices, server computing devices, tablet computers, laptop computers, telephone or other communication devices, personal digital assistants, and the like. Essentially, data processing system 800 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112 (f), unless the element is expressly recited using the phrase "means for."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java™ Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor, functional units of a processor, or computer implemented system, and logic integrated with and/or executable by the system, processor, or functional units, the logic being configured to perform one or more of the process steps cited herein. What is meant by integrated with is that in an embodiment the functional unit or processor has logic embedded therewith as hardware logic, such as an application specific integrated circuit (ASIC), a field programmable gate array (FPGA), etc. By executable by the functional unit or processor, what is meant is that the logic in an embodiment is hardware logic; software logic such as firmware, part of an operating system, part of an application program; etc., or some combination of hardware or software logic that is accessible by the functional unit or processor and configured to cause the functional unit or processor to perform some functionality upon execution by the functional unit or processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above. If will be further appreciated that embodiments of the present invention may be provided in the form of a service deployed on behalf of a customer to offer a service on demand.

The terminology used herein is for the purpose of describing particular embodiments only and is not intended to be limiting of the invention. Unless otherwise specifically defined herein, all terms are to be given their broadest possible interpretation including meanings implied from the specification as well as meanings understood by those skilled in the art and/or as defined in dictionaries, treatises, etc. The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A computer-implemented method for monitoring one or more trained intelligent agents that predicts transactional activity of one or more simulated persons comprising a processor and a memory having instructions, which are executed by the processor to cause the processor to implement the method, the method comprising:

providing one or more intelligent agents trained to simulate transactional activity of a simulated person;

running at least one of the one or more trained intelligent agents to predict simulated transactional activity of a simulated person of the at least one of the one or more trained intelligent agents for a measured period;

scoring the simulated transactional activity for the measured period using a policy engine of the at least one of the one or more trained intelligent agents;

injecting testing data into the simulated transactional activity of the at least one of the one or more trained agents for the measured period to form testing transactional behavior for the measured period;

scoring the testing transactional activity for the measured period, wherein scoring the testing transactional activity of the measured period is performed using the policy engine of the at least one of the one or more trained intelligent agents;

determining if the score of the simulated transactional activity for the measured period is different than the score of the testing transactional activity for the measured period; and generating, in response to determining that the score of the simulated transaction activity for the measured period is different than the score of the testing transactional activity for the measured period, a report indicating a deviation of the at least one of the one or more trained intelligent agents.

2. The method as recited in claim 1, wherein the at least one of the one or more trained intelligent agents is based upon the transactional activity of a representative person, wherein the representative person comprises a plurality of actual persons that are clustered based upon the transactional activity of the plurality of actual persons via hyper-dimensional clustering.

3. The method as recited in claim 1, wherein the measured period is at least one of the group consisting of a time period, a number of transactions, and a combination thereof.

4. The method recited in claim 3, wherein the measured period is twenty-four hours.

5. The method as recited in claim 1, wherein determining if the score of the simulated transactional activity for the measured period is different than the score of the testing transactional activity for the measured period comprises comparing the score of the simulated transactional activity for the measured period to the score of the testing transactional activity for the measured period.

6. The method as recited in claim 1, wherein determining if the score of the simulated transaction activity for the measured period is different than the score of the testing transactional activity for the measured period comprises determining if the score of the simulated transactional activity for the measured period is different by at least a threshold from the score of the testing transactional activity for the measured period.

7. The method as recited in claim 6, wherein the threshold is at least one of the group consisting of: a selectable threshold, a fixed threshold, a programmable threshold, an adjustable threshold, a predefined threshold, a predetermined threshold, and combinations thereof.

8. The method as recited in claim 1, wherein scoring the simulated transactional activity for the measured period comprises scoring the simulated transactional activity of the simulated person for the measured period in confidence levels, and wherein scoring the testing transactional activity for the measured period comprises scoring the testing transactional activity for the measured period in confidence levels.

9. The method as recited in claim 8, wherein determining if the score of the simulated transactional activity for the measured period is different than the score of the testing transactional activity for the measured period comprises comparing the confidence level of the simulated transactional activity for the measured period to the confidence level of the testing transactional activity for the measured period, and determining if the confidence level of the simulated transactional activity deviates from the confidence level of the testing transactional activity.

10. The method as recited in claim 1, wherein the injected testing data is abnormal testing data outside the normal transactional activity of the simulated person.

11. The method as recited in claim 1, wherein after determining if the score of the simulated transactional activity for the measured period is different than the score of the testing transactional activity for the measured period, the method further comprises:

running the at least one of the one or more trained intelligent agents to predict simulated transactional activity of the simulated customer for a second measured period;

scoring the simulated transactional activity for the second measured period;

injecting additional testing data into the simulated transactional activity for the second measured period to form additional testing transactional activity;

scoring the additional testing transactional activity for the second measured period;

determining if the score of the simulated transactional activity for the second measured period is different than the score of the additional testing transactional activity for the second measured period; and generating, in response to determining that the score of the simulated transactional activity for the second measured period is different than the score of the additional testing transactional for the second measured period, a second report indicating a deviation of the at least one of the one or more trained intelligent agents.

12. The method as recited in claim 1, further comprising:

providing a copy of the at least one of the one or more trained intelligent agents;

running the copy of the at least one of the one or more trained intelligent agents for the measured period; and injecting the copy of the at least one of the one or more trained intelligent agents with the testing data to form the testing transactional activity.

13. A computer program product for monitoring one or more trained intelligent agents that predicts simulated activity of a simulated person, the computer program product comprising a computer readable storage medium having program instructions embodied therewith, the program instructions executable by a processor to cause the processor to:

run at least one of one or more trained intelligent agents to predict simulated activity of the simulated person for a measured period;

score the predicted simulated activity for the measured period using the policy engine of the at least one of the one or more intelligent agents;

inject testing data into a copy of the predicted simulated activity for the measured period to form testing activity for the measured period;

score the testing activity for the measured period using the policy engine of the at least one of the one or more intelligent agents;

determine if the score of the predicted simulated activity for the measured period is different than the score of the testing activity for the measured period; and generate, in response to determining that the score of the predicted simulated activity for the measured period is different than the score of the testing activity for the measured period, a report indicating a deviation of the at least one of the one or more intelligent agents.

14. The computer program product as recited in claim 13, wherein the measured period is a time period.

15. The computer program product as recited in claim 13, further comprising program instructions executable by the processor to cause the processor to:

provide a copy of the at least one of the one or more trained intelligent agents;

run the copy of the at least one of the one or more trained intelligent agents for the measured period; and inject the copy of the at least one of the trained intelligent agents with the testing data to form the testing transactional activity for the measured period.

16. The computer program product as recited in claim 13, wherein determining if the score of the predicted simulated activity for the measured period is different than the score of the testing activity for the measured period comprises programming instructions executable by the processor to cause the processor to:

score a confidence level of the predicted simulated activity for the measured period;

score a confidence level of the testing activity for the measured period, wherein the scoring of the testing activity for the measured period is performed by the policy engine of the at least one of the one or more trained intelligent agents;

determine whether the confidence level of the predicted simulated activity for the measured period deviates by at least a threshold from the confidence level of the testing activity for the measured period; and generate, in response to determining that the confidence level of the predicted simulated activity for the measured period deviates by a threshold from the confidence level of the testing activity for the measured period, the report.

17. The computer program product as recited in claim 13, wherein after determining if the score of the predicted simulated activity for the measured period is different than the score of the testing activity for the measured period further comprises programming instructions executable by the processor to cause the processor to:

run by the at least one of the one or more trained intelligent agents to predict simulated activity of the simulated person for a second measured period;

score the predicted simulated activity for the second measured period;

inject additional testing data into the simulated activity for the second measured period to form additional testing activity for the second measured period;

score the additional testing activity for the second measured period;

determine if the score of the predicted simulated translational activity for the second measured period is different than the score of the additional testing activity for the second measured period; and generate, in response to determining that the score of the predicted simulated activity for the second measured period is different than the score of the additional testing activity for the second measured period, a second report.

18. A system for monitoring for deviations in one or more trained intelligent agents used to predict a behavioral pattern from simulated transaction data, the system comprising:

one or more trained intelligent agents, wherein each trained intelligent agent is configured and trained to predict activity of a simulated person;

a computer readable storage medium having program instructions embodied therewith; and a processor configured to execute the program instructions to cause the processor to:

run at least one of the one or more trained intelligent agents to predict simulated activity of a simulated person of the at least one of the one or more trained intelligent agents for a time period;

score the predicted simulated activity for the time period using a policy engine of the at least one of the one or more trained intelligent agents;

inject testing data into the predicted simulated activity of the at least one of the one or more trained intelligent agents for the time period to form testing activity for the time period;

score the testing activity for the time period, wherein scoring the testing activity for the time period is performed by the policy engine of the at least one of the one or more trained intelligent agents;

determine if the score of the predicted simulated activity for the time period is different than the score of the testing activity for the time period; and generate, in response to determining that the score of the predicted simulated activity for the time period is different than the score of the testing activity for the time period, a report indicating a deviation of the at least one of the one or more trained intelligent agents.

19. The system of claim 18, wherein the program instructions executable by the processor further cause the processor to:

provide a copy of the at least one of the one or more trained intelligent agents;

run the copy of the at least one of the one or more trained intelligent agents for the time period;

inject the copy of the at least one of the one or more trained intelligent agents with the testing data to form the testing activity for the time period; and determine if the score of the predicted simulated activity for the time period is different than the score of the testing activity for the time period comprises:

score a confidence level for the predicted simulated activity for the time period;

score a confidence level for the testing activity for the time period using a policy engine of the at least one of the one or more trained intelligent agents;

determine whether the confidence level of the predicted simulated activity for the time period deviates by at least a threshold from the confidence level of the testing activity for the time period; and generate, in response to determining that the confidence level of the predicted simulated activity for the time period deviates by at least a threshold from the confidence level of the testing activity for the time period, the report indicating the deviation of the at least one of the one or more trained intelligent agents.

20. The system of claim 18, further comprising using the report to adjust the policy engine of the at least one of the one or more trained intelligent agents.

\* \* \* \* \*